United States Patent
Ricketts et al.

(10) Patent No.: US 9,814,184 B2
(45) Date of Patent: Nov. 14, 2017

(54) CROP MATERIAL FLOW CONTROL SYSTEM

(75) Inventors: Jonathan E. Ricketts, Ephrata, PA (US); Curtis F. Hillen, Lititz, PA (US); Herbert M. Farley, Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/292,591

(22) Filed: Nov. 9, 2011

(65) Prior Publication Data
US 2013/0116018 A1 May 9, 2013

(51) Int. Cl.
*A01D 75/28* (2006.01)
*A01F 12/44* (2006.01)

(52) U.S. Cl.
CPC .......... *A01D 75/282* (2013.01); *A01F 12/446* (2013.01); *A01F 12/448* (2013.01)

(58) Field of Classification Search
USPC ...................... 460/8–10, 101, 102
See application file for complete search history.

(56) References Cited

U.S. PATENT DOCUMENTS

| | | | |
|---|---|---|---|
| 1,064,440 A | 6/1913 | Brown | |
| 1,243,284 A * | 10/1917 | Goodman | ................. B07B 1/46 209/319 |
| 2,542,346 A | 2/1951 | Mormann | |
| 3,108,064 A | 10/1963 | Grant | |
| 3,645,270 A * | 2/1972 | Rowland-Hill | ........... A01F 7/06 460/69 |
| 3,757,797 A * | 9/1973 | Mathews | .................. A01F 7/06 460/101 |
| 4,539,824 A | 9/1985 | Kuraoka et al. | |
| 4,548,214 A | 10/1985 | Sheehan et al. | |
| 4,557,276 A | 12/1985 | Hyman et al. | |
| 4,723,558 A * | 2/1988 | Usick | ...................... A01F 12/44 460/100 |
| 4,875,889 A | 10/1989 | Hagerer et al. | |
| 4,897,071 A | 1/1990 | Desnijder et al. | |
| 5,021,029 A | 6/1991 | Usick | |
| 5,282,771 A | 2/1994 | Underwood | |

(Continued)

FOREIGN PATENT DOCUMENTS

| | | |
|---|---|---|
| EP | 459109 A2 | 12/1991 |
| EP | 1595435 A1 | 11/2005 |

*Primary Examiner* — Alicia Torres
(74) *Attorney, Agent, or Firm* — Patrick M. Sheldrake

(57) ABSTRACT

An apparatus and method for distributing crop material onto a cleaning sieve of an agricultural combine. The method includes providing at least one sensor configured and operable for sensing information representative of at least one of a quantity of grain associated with the crop material distributor and an inclination angle associated with the crop material distributor, and outputting signals representative thereof. The method includes providing a crop material distributor disposed between a threshing system of the combine and the sieve, for distributing crop material from the threshing system generally evenly onto the sieve. The method includes providing an apparatus operably associated with the distributor for controllably distributing crop material onto the sieve. The method includes controlling a position of the apparatus as a function of signals from the at least one sensor.

11 Claims, 4 Drawing Sheets

(56) References Cited

U.S. PATENT DOCUMENTS

| | | | |
|---|---|---|---|
| 5,338,257 A | | 8/1994 | Underwood |
| 5,527,219 A | * | 6/1996 | Schumacher ......... A01F 12/446 460/101 |
| 5,791,986 A | * | 8/1998 | Underwood ............ A01F 12/44 460/101 |
| 5,795,223 A | * | 8/1998 | Spiesberger et al. ......... 460/102 |
| 6,066,045 A | * | 5/2000 | Noomen ................. A01F 12/44 460/101 |
| 6,458,031 B1 | * | 10/2002 | Matousek et al. .............. 460/99 |
| 6,579,172 B2 | * | 6/2003 | Lauer ........................... 460/101 |
| 7,572,180 B2 | | 8/2009 | Ricketts et al. |
| 7,771,260 B2 | | 8/2010 | Ricketts et al. |
| 7,841,931 B2 | | 11/2010 | Straeter |
| 8,282,453 B1 | * | 10/2012 | Hillen et al. .................... 460/13 |
| 2002/0128054 A1 | * | 9/2002 | Lauer ........................... 460/101 |
| 2005/0245300 A1 | * | 11/2005 | Maertens et al. ............... 460/59 |
| 2008/0194306 A1 | * | 8/2008 | Ricketts .............. A01D 75/282 460/112 |

\* cited by examiner

CROP MATERIAL FLOW CONTROL SYSTEM

FIELD OF THE INVENTION

The present invention relates generally to a delivery control system for a harvester, and more particularly, to a delivery control system a harvester, such as an agricultural combine for evening the distribution of threshed crops being delivered from the threshing system to the cleaning system of a combine, including when the receiving component of the cleaning system is tilted to accommodate uneven terrain, such as uphill or downhill travel by the combine.

BACKGROUND OF THE INVENTION

Combines are used all over the world to harvest many different crops. A typical combine configuration utilizes a separation or threshing system including one or more rotors partially or fully surrounded by a perforated concave, wherein threshed crop material will fall through the perforations of the concave enroute to a cleaning system operable for separating grain of the threshed crop material from material other than grain (MOG). Often, due to the combine encountering uneven terrain, such as encountered during uphill and downhill travel, the rate of discharge of this threshed crop material from the separating system to the cleaning system can widely fluctuate. For example, the rate of discharged crop material can be temporarily reduced or interrupted during downhill travel, with an opposite effect occurring during uphill travel. A significant problem that can result from uneven distribution of crop material to the cleaning system is increased grain loss resulting from overloading of regions of the cleaning system sieve or sieves.

In light of the capabilities and limitations of the apparatus discussed above for distributing crop material delivery to a cleaning system of a combine, what is sought is a system and method which allows optimizing this capability for accommodating both uneven threshing system output, and uneven terrain, particularly uphill and downhill travel conditions.

SUMMARY OF THE INVENTION

Other features and advantages of the present invention will be apparent from the following more detailed description of the preferred embodiment, taken in conjunction with the accompanying drawings which illustrate, by way of example, the principles of the invention.

The present invention relates to a system for distributing crop material on a cleaning sieve of an agricultural combine including a threshing system. A sieve is positioned and configured for receiving crop material containing grain from the threshing system and allowing the grain and smaller elements of the crop material to pass through the sieve while guiding and propelling a flow of larger elements of the crop material past an edge of the sieve. A crop material distributor is disposed between the threshing system and the sieve, configured and operable for distributing the crop material from the threshing system onto the sieve. An apparatus is operably associated with the crop material distributor, including an actuator configured and controllably operable for positioning the apparatus. A sensor is configured and operable in response to sensing information representative of at least one of a quantity of grain associated with the crop material distributor and an inclination angle associated with the crop material distributor and outputting signals representative thereof. A control system is connected in operative control of the actuator, and the sensor for receiving the signals outputted thereby, wherein the control system is operable for controlling the position of the actuator for positioning the apparatus.

The present invention further relates to a retrofit kit for an agricultural combine including an apparatus operably associable with a crop material distributor disposed between a threshing system and a sieve positioned and configured for receiving crop material containing grain from the threshing system and allowing the grain and smaller elements of the crop material to pass through the sieve while guiding and propelling a flow of larger elements of the crop material past an edge of the sieve. The apparatus is configured and operable for distributing crop material from the threshing system onto the sieve. An actuator is configurable and controllably operable for positioning the apparatus. A sensor is configurable and operable for sensing information representative of at least one of a quantity of grain associated with the crop material distributor and an inclination angle associated with the crop material distributor and outputting signals representative thereof. A compatible software package is provided for establishing a control system having a controller for providing operative control of the actuator and receiving the signals outputted thereby. The control system is operable for controlling the position of the actuator for positioning the apparatus. Mechanical fasteners, electrical wiring and electrical connectors as required for installation of the apparatus, the actuator, the sensor and the control system in the combine.

The invention yet further relates to a method for distributing crop material onto a cleaning sieve of an agricultural combine. The method includes providing at least one sensor configured and operable for sensing information representative of at least one of a quantity of grain associated with the crop material distributor and an inclination angle associated with the crop material distributor, and outputting signals representative thereof. The method includes providing a crop material distributor disposed between a threshing system of the combine and the sieve, for distributing crop material from the threshing system generally evenly onto the sieve. The method further includes providing an apparatus operably associated with the distributor for controllably distributing crop material onto the sieve. The method additionally includes controlling a position of the apparatus as a function of signals from the at least one sensor.

Grain loss sensors are operable in the conventional, well-known manner, for instance, by sensing electrical capacitance change, for measuring or quantifying the amount of grain loss past the edge of the cleaning sieve, and can be disposed, for instance, adjacent opposite ends of the edge of the sieve, and at one or more intermediate locations therealong, for determining grain losses at those locations, which information can be used for determining a distribution of grain losses across the edge or extent of the sieve. Grain loss sensors can be used alone, or with one or more other sensors, for instance, a load sensor, mass sensor, optical sensor, or the like, for determining crop material distribution on or to the cleaning sieve, and/or on or a crop material distributor disposed intermediate the threshing and cleaning systems, such as, a grain pan, sieve, preparation floor, or the like.

Numerous other features and advantages of the present invention will become readily apparent from the following detailed description, the accompanying drawings, and the appended claims.

Numerous other features and advantages of the present invention will become readily apparent from the following detailed description, the accompanying drawings, and the appended claims.

DETAILED DESCRIPTION OF THE INVENTION

Figure 1:
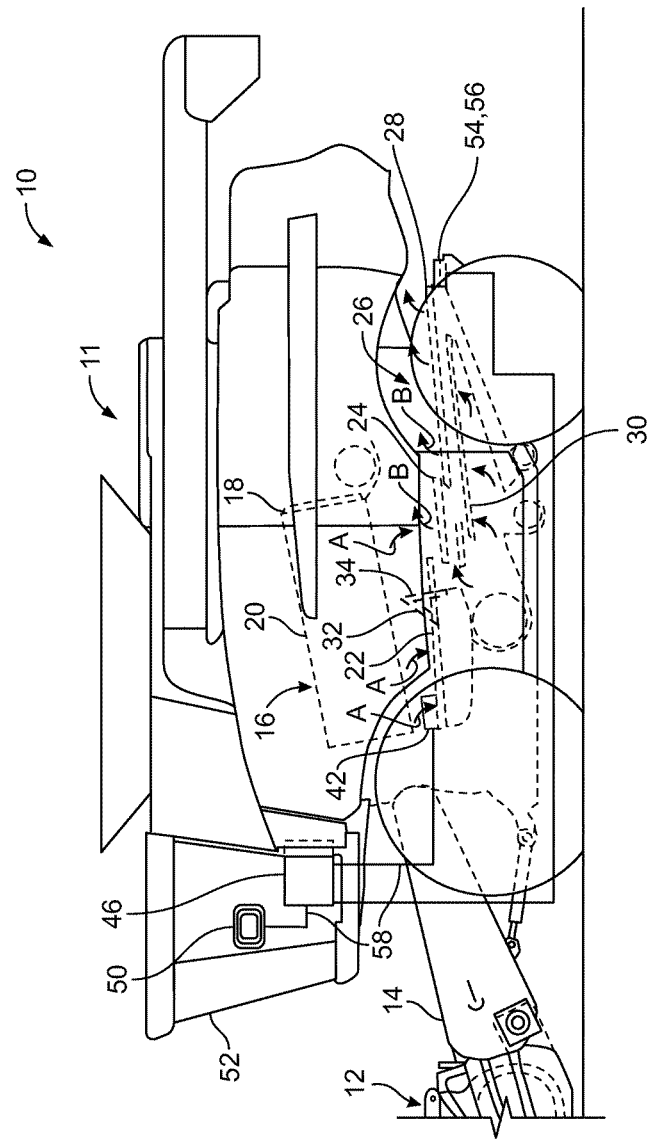
FIG. 1 is a side view of an agricultural combine, including a system for controllably delivering crop material to a distribution system of the combine, according to the present invention.

Referring now to the drawings, wherein preferred embodiments of the present invention are shown, in FIG. 1, a typical self-propelled agricultural combine 10 is shown, including a header 12 mounted on a front end thereof, and operable for severing crops from a field during forward motion of combine 10. Combine 10 includes a feeder 14 operable for conveying the cut crops to a rotary threshing system 16 within combine 10. Threshing system 16 generally includes one or more rotors 18 rotatable within a corresponding number of perforated concaves 20, for threshing and separating smaller elements of crop material including grain from larger elements such as stalks, leaves and the like. Flows of the smaller elements of the crop material are discharged through the perforations of concave 20, as denoted generally by arrows A. Generally, the flows of crop material denoted by arrows A will be uneven, so as to be more concentrated or heavier in some regions, and lighter in other regions, which unevenness will be the result of one or more of a variety of factors, as discussed above.

The flows of crop material, denoted by arrows A, will fall mostly onto a crop material distributor 22 disposed beneath threshing system 16, which distributor 22 can comprise a conventionally constructed grain pan operable for conveying crop material rearwardly thereover to a rear edge thereof, over which the crop material will be propelled so as to fall as a mat onto an upper cleaning sieve 24 of a cleaning system 26 of combine 10. Alternatively, distributor 22 can comprise a sieve. As the crop material mat drops onto upper cleaning sieve 24, that sieve will be vibrated while a flow of air is directed upwardly and rearwardly therethrough, as denoted by arrows B, such that larger, lighter elements of the crop material other than grain will be directed over or past a rear edge 28 of sieve 24, for disposal, in the well-known manner. Smaller, heavier elements of the crop material, including grain, will be allowed to pass downwardly through sieve 24 to a lower sieve 30, for further cleaning, again, in the well known manner.

Figure 2:
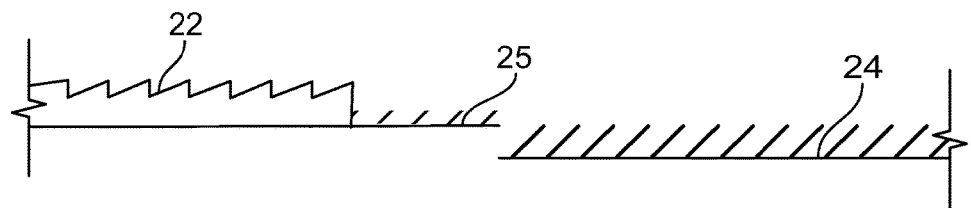
FIGS. 2-6 are partial side views of different embodiments of distribution systems according to the present invention.

As shown in FIG. 2, crop material distributor 22 includes a pree-sieve or shortened sieve 25 connected thereto, after which crop material (not shown) passing over sieve 25 is deposited onto sieve 24. Seed would be separated from MOG as the crop material moves rearward (i.e., from distributor 22 toward sieve 24).

Figure 3:
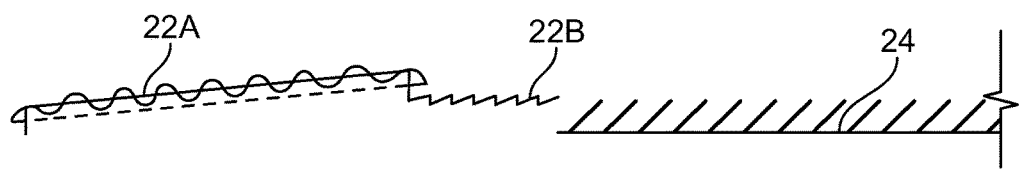

As shown in FIG. 3, another embodiment of crop material distributor 22 includes an auger or auger distributor or auger bed 22A extending to a shortened grain pan 25. Grain pan 25 provides a small improvement with respect to grain loss or "dumping" as the crop material moves rearward, such as from uphill travel of the harvester (not shown). However, improvements to further reduce grain loss can be achieved by embodiments, such as discussed in FIGS. 4-6.

Figure 4:
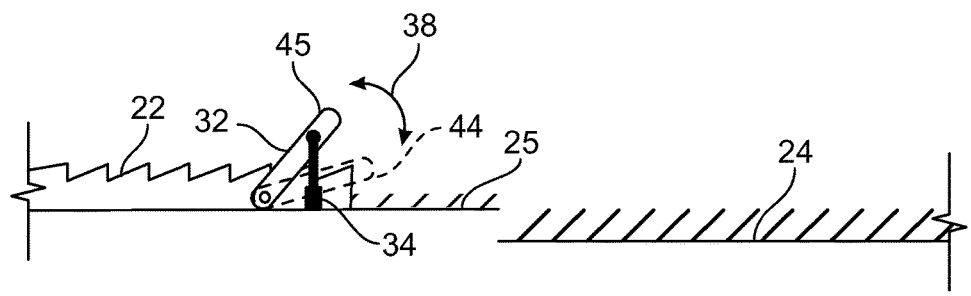
Figure 5:
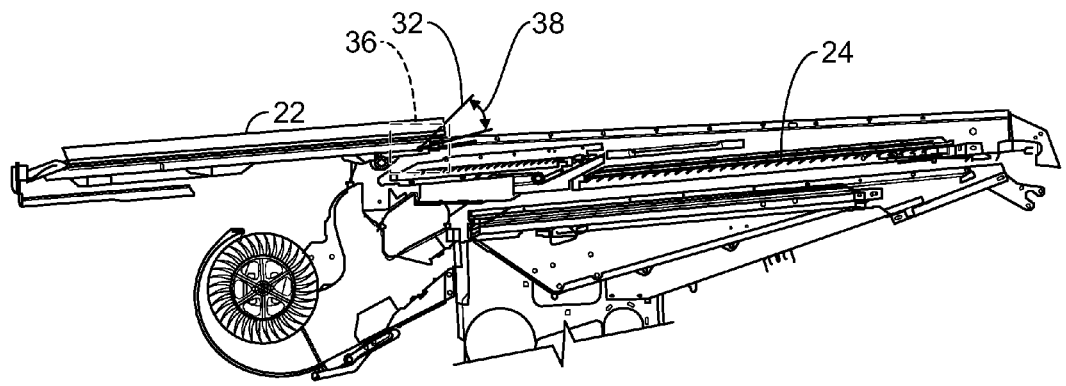
Figure 7:
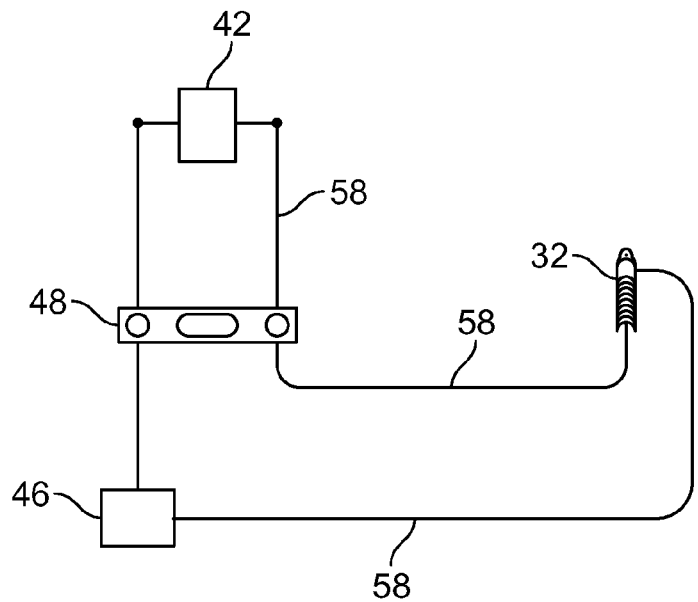
FIG. 7 is a schematic representation of an embodiment of a distribution system according to the present invention.

As shown in FIGS. 4-5, a control apparatus or flow apparatus or apparatus 32 is pivotably connected to crop material distributor 22 and to an actuator 34, such as a linear actuator. As further shown FIG. 4, apparatus 32 can be positionable, such as by a rotational movement 38 between a first angular position 44 and a second angular position 45 with respect to distributor 22. In an alternate embodiment, apparatus 32 when positioned at second angular position 45 could approach or coincide with a substantially vertical arrangement that is substantially perpendicular to distributor 22. In other words, in an effort to reduce a "surge" of crop material, such as associated with the harvester encountering uphill terrain of sufficient magnitude to urge an amount of crop material too large for the cleaning system of the combine to properly handle, the crop material moving along distributor 22 toward sieve 25, a controller 46 controls the position of apparatus 32. For example, as shown in FIGS. 4 and 7, controller 46, in response to receiving a signal from a sensor 48, such as an inclinometer generated in response to sensing an inclination angle of sufficient magnitude, urges apparatus 32 into rotational movement 38 in a direction toward the second position 45. As apparatus 32 is rotated toward second position 45, apparatus 32, which extends substantially transversely with respect to distributor 22, similar to a raising drawbridge, provides an increasing impediment with respect to crop material moving toward sieve 25. Alternately, in response to the inclinometer or sensor 48 generating a signal upon sensing a sufficient reduction in the inclination angle, apparatus 32 is rotated in the opposite direction, i.e., rotational movement 38 toward first angular position 44. It is to be understood that the timing and extent, and even speed of such rotational movement may be affected by the previous magnitude, as well as duration of the "uphill" inclination angle, the type of crop material, as well as other factors.

As shown in FIG. 5, an actuator 36, such as a rotary actuator, may to used to rotate apparatus 32 between positions of angular movement 38, as previously discussed in FIG. 4. It is to be understood that apparatus may be a solid piece of material, in one embodiment, or may contain slots or have openings formed therein in another embodiment.

Figure 6:
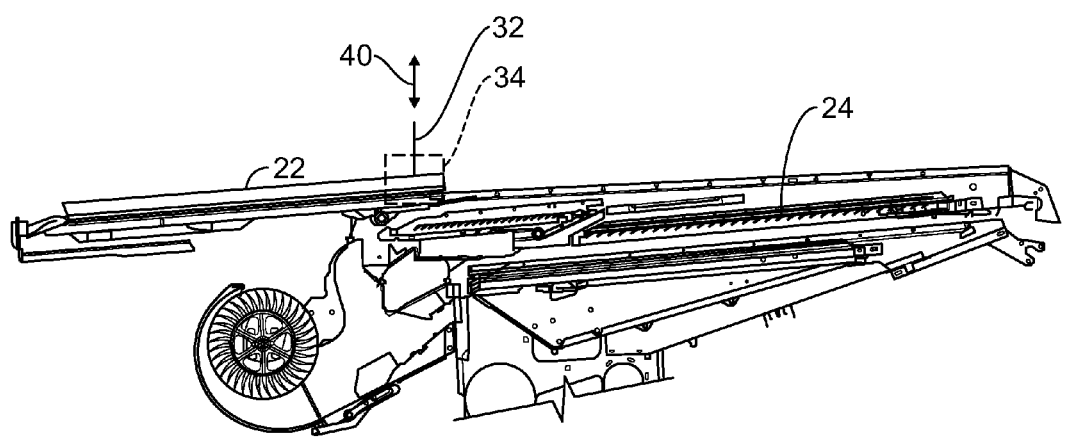

As shown in FIG. 6, another embodiment of the system includes apparatus 32 being secured to an actuator 36, such as a linear actuator, which apparatus 32 being positioned above distributor 22. Actuator 36 may be secured to inner structure of the harvester in one embodiment, or may be secured to distributor 22 in another embodiment. With either attaching arrangement, apparatus 32 is urged into axial movement 40 toward distributor 22 by controller 46 in response to controller 46 receiving a signal from inclinometer or sensor 48 that indicates an "uphill" inclination angle as previously discussed above. Conversely, apparatus 32 is urged into axial movement 40 away from distributor 22 by controller 46 in response to controller 46 receiving a signal from inclinometer or sensor 48 that indicates a sufficient reduction in inclination angle as previously discussed above.

Actuators 34 and 36, which may be linear or rotary actuators, respectively, can be suitably powered, for instance, electrically or fluidly, in the well-known manner. Alternatively, the actuators could comprise motors, or the like.

In exemplary embodiments of harvester or combine 10 shown in FIGS. 1, 4, 5, respective actuator 34, 36 is operatively connected to a single controller 46, which preferably comprises a conventional programmable processor based controller commonly utilized for controlling various combine operations and functions in the well-known manner. In this regard, controller 46 can control actuator 34 for controlling the position of distributor 32 for controlling grain distribution to sieve 24 as a function of a desired parameter according to the present invention, which here has been selected to be grain loss. Thus, system 11 comprises controller 46, but it should be recognized that controller 46 can perform a variety of other functions, including, but not limited to, cleaning system leveling. System 11 additionally is illustrated as comprising an optional input device 50, which can be for instance, an interactive device such as a touch screen or the like, or a switch, connected to controller 46 and located within an operator cab 52 of combine 10, usable for inputting positional and other commands to system 11, and optionally for viewing system information. System 11 preferably also comprises at least one sensor operable for sensing or detecting a condition indicative of performance thereof, and/or the effects of performance thereof, to facilitate monitoring and controlling operation thereof, which, in this embodiment of the system, includes at least two grain loss detectors 54 and 56 disposed adjacent opposite ends of, or at spaced apart locations along, rear edge 28 of sieve 24.

Controller 46 is connected to actuator 34; to actuator 36, if present (if a cleaning system leveling capability is provided); to input device 50; and to grain loss detectors 54 and 56, via suitable conductive paths 58, which can include, for instance, but are not limited to, wires of a wiring harness, and/or one or more communications networks, such as a controller area network.

Controller 46 is automatically operable for controlling the position of apparatus 32 as a function of system 11, and at least sieve 24 of cleaning system 26 (sieves 24 and 30 being jointly or separately controllable, as desired for a particular application) as a function of the distribution system. Here, as explained above, under at least some circumstances, threshing system 16 will discharge crop material at higher rates, or in heavier concentrations, from some regions of concave 20 compared to others. This can occur for a variety of reasons, such as, but not limited to, crop type, population, and moisture content, and can vary at least somewhat over the course of a harvesting episode. This can also occur, at least in part, as a result of combine settings, such as, but not limited to, a speed of operation of rotor 18, and a gap between rotor 18 and concave 20. This is undesirable, as also explained above, as it can affect the performance of cleaning system 26, particularly the amount of grain loss, as heavy build ups of crop material, particularly on upper sieve 24, can result in increased grain loss over or past rear edge 28. A problem identified above in this regard is that crop material build ups and concentrations on distributor 22 will typically be conveyed onto upper sieve 24. Sideward tilting of the combine can also result in increased crop material concentrations and build ups, with Applicant's U.S. Pat. No. 7,771,260, as previously mentioned, configured to address such sideward tilting, such as associated with the combine laterally traversing a slope of a hill.

As further shown in FIGS. 1 and 4, controller 46 of system 11 is automatically operable for determining a position of apparatus 32, such as between a first angular position 44 and a second angular position 45 with respect to crop material distributor 22 required for distributing crop material flow to cleaning system 26, in an ongoing manner, in real-time, or near real-time, responsive to a sensed condition or conditions indicative of performance and/or another selected parameter, which here is grain loss, as sensed by grain loss detectors 54 and 56. The angular orientation of apparatus 32 can also be set by an operator, via commands inputted using input device 50. System 11 can then automatically operate to maintain a performance parameter achieved by the inputted setting, for instance, a satisfactory or set grain loss level, and can operate to even out the grain loss between the two sides of the cleaning system, as a function of comparison of the signals from grain loss sensors 54 and 56, and setting opposed ends of apparatus 32 at different height levels by respective actuators 34 (only one acutator 34 shown in FIG. 4). Thus, if grain distribution from the threshing system changes, for instance, as a function of any of the factors discussed above, and grain loss from one side of the cleaning system exceeds loss from the other side by a certain amount, system 11 can automatically detect this. Controller 46 can then responsively make an appropriate adjustments to the positions of the opposed ends of apparatus 32 via respective actuators 34, as required.

Figure 8:
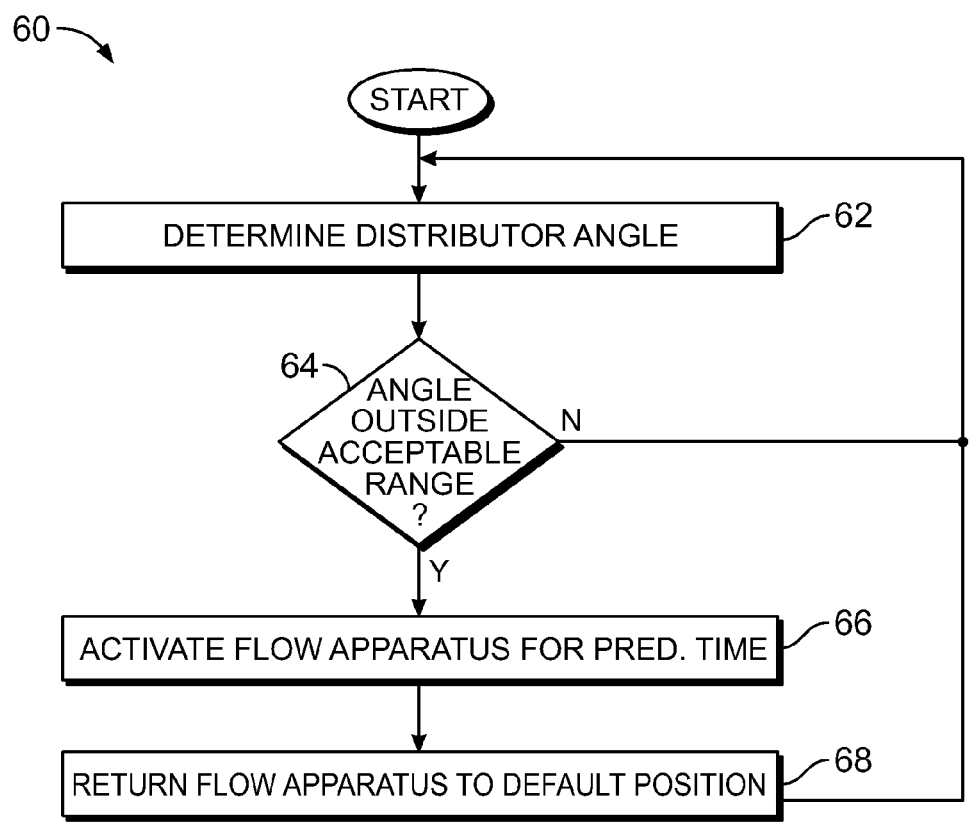
FIG. 8 is a flow diagram of an embodiment of a distribution system according to the present invention.

FIG. 8 is a high level flow diagram 60 illustrating steps of one possible method of operation of system 11 for controlling the position of apparatus 32 of distributor 22. According to the method, at block 62, a distributor inclination angle will be determined. This can be via an automatic process as controlled by controller 46, responsive to a desired parameter, such as grain loss, and the above-described manner (inclinometer or sensor 48). Alternatively, this could be responsive to a manually inputted command, via input device 50. Controller 46 would then either automatically control apparatus 32 for controlling the control parameter, e.g., grain loss, or for maintaining the inputted position. As part of its cleaning system crop distribution function, at block 64 the inclination angle is determined whether it is outside of an acceptable range, such as, for example, within 5 degrees from a horizontal plane. If the inclination angle is not determined to be outside of an acceptable range, control of the method is returned to block 62 to again determine the inclination angle of the crop material distributor. However, if the inclination angle is determined to be outside of an acceptable range, method proceeds to block 66 which actuates flow apparatus 32 for a predetermined period of time. In one embodiment the predetermined period of time is a fixed period of time, such as 5 seconds, or in another embodiment the predetermined time may depend upon the magnitude of the inclination angle, i.e., the magnitude of the amount inclination angle is outside of the acceptable range. Stated another way, the greater the magnitude of the inclination angle, the greater the extent of movement or "blockage" of crop material by flow apparatus 32. Upon completion of block 66, at block 68 the controller returns flow apparatus 32 to its default or centered position, with control of the method returning to block 62 to repeat the method. In another embodiment, signals from other sensors 42 (FIGS. 1, 7), such as sensors associated with quantity of grain measurement, including a weight of crop material positioned on the crop material distributor or sensors associated with measurement of structural loading on a system drive component, may also be utilized to control the position of flow apparatus 32. Additionally sensors associated with measurement of structural loading on system drive components may be utilized. That is, if grain sensors indicated that excessive grain loss were still occurring, flow apparatus 32 would not yet be returned to the default position. Controller 46 can be programmed to automatically adjust for such sensor readings, on an ongoing basis, in real-time, or near real-time, to maintain the control parameter, or the commanded position of apparatus 32 in relation to a fixed reference, such as horizontal, so as to maintain system performance.

It is to be understood that a retrofit kit for an agricultural combine could be created that includes apparatus 32 which is operably associable with crop material distributor 22. Distributor 22 is disposed between threshing system 16 and sieve 24 positioned and configured for receiving crop material containing grain from the threshing system and allowing the grain and smaller elements of the crop material to pass through the sieve while guiding and propelling a flow of larger elements of the crop material past edge 28 of the sieve. Apparatus 32 is configured and operable for distributing crop material from threshing system 16 onto sieve 24. An actuator, such as actuator 34, 36 is configurable and controllably operable for positioning apparatus 32. A sensor, such as sensor 42 is configurable and operable for sensing information representative of at least one of a quantity of grain associated with crop material distributor 22 and an inclination angle associated with the crop material distributor and outputting signals representative thereof. A compatible software package (not shown) is provided for establishing a control system providing operative control of the actuator. It is to be understood that a software package can include an upgrade or a portion of software code that can be uploaded into existing software of a combine in a well known manner. In one embodiment, the software may already be included in the controller, or in another embodiment, the software may be included in components insertable, whether temporarily or permanently, into the controller, such as a memory chip or circuit board or the like. The software installed in the controller is then configured for receiving the signals outputted thereby, such that the control system is operable for controlling the position of the actuator for positioning the apparatus. Mechanical fasteners, electrical wiring and electrical connectors (not shown) as required for installation of the apparatus that is well known, the actuator, the sensor and the control system in the combine.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system that regulates delivery of crop material to a sieve of an agricultural combine, comprising:
   a threshing system;
   the sieve positioned and configured to receive a flow of crop material containing grain from the threshing system and allowing the grain and various elements of the crop material to pass through the sieve while guiding and propelling a flow of other elements of the crop material past an edge of the sieve;
   a crop material distributor disposed generally forward of and above the sieve to distribute the crop material from the threshing system onto the sieve;
   an apparatus having a surface transverse to an upper surface of the distributor that impedes the flow of crop material over the crop material distributor, wherein the surface is movable by an actuator to one of raise or lower the surface with respect to the upper surface of the distributor, to control the flow of crop over the crop material distributor and on to the sieve; wherein the rotation of the apparatus toward a position substantially perpendicular to the crop material distributor impedes the flow of crop material from the threshing system on to the sieve,
   a sensor that detects information associated with at least one of the crop material or an angle of inclination for the crop material distributor,
   a control system that controls the actuator in response to signals generated based on the information; and
   the apparatus is pivotally connected to the crop material distributor that forms an angle of connection between the surface of the apparatus and an upper surface of the crop material distributor, wherein the angle of connection between the apparatus and the crop material distributor changes during the rotation, to regulate the flow of crop material rearward over the surface of the apparatus to the sieve.

2. The system of claim 1, wherein the apparatus is positioned in close proximity with an end of the crop material distributor.

3. The system of claim 1, wherein the sensor detects information associated with a depth of crop material positioned on the crop material distributor.

4. The system of claim 1, wherein the sensor detects information associated with weight of crop material positioned on the crop material distributor.

5. The system of claim 1, wherein the actuator is pivotably connected between the distributor and the apparatus and the control system is operable for controlling the actuator to urge the apparatus between a first angular position and a second angular position with respect to the distributor.

6. The system of claim 1, wherein the actuator is connected between the distributor and the apparatus and the control system is operable for controlling the actuator to urge the apparatus between a first axial position and a second axial position with respect to the distributor.

7. The system of claim 1, wherein the actuator is connected to the distributor, the actuator urging the apparatus between a first axial position and a second axial position with respect to the distributor.

8. A retrofit kit for an agricultural combine comprising:
   an apparatus operably associable with a crop material distributor disposed generally forward of and above a sieve positioned and configured to receive crop material containing grain from a threshing system and allowing the grain and smaller elements of the crop material to pass through the sieve while guiding and propelling a flow of larger elements of the crop material past an edge of the sieve, the apparatus configured and operable for distributing crop material from the threshing system onto the sieve; the apparatus comprising a transverse surface with respect to the distributor connected to and movable by an actuator to one of raise or lower the surface with respect to an upper surface of the distributor to regulate the flow of crop over the crop material distributor and on to the sieve, wherein raising the surface of the apparatus above the upper surface of the crop material distributor impedes the flow of crop material from the threshing system on to the sieve;
   the actuator configurable and controllably operable to one of raise or lower the surface of apparatus with respect to the distributor;
   a sensor that senses information representative of at least one of a quantity of grain associated with the crop material distributor and a position associated with the crop material distributor and outputting signals representative thereof;

a compatible software package that facilitates regulation of crop delivery via a control system having a controller for providing operative control of the actuator and receiving the signals outputted thereby, wherein the control system is operable for controlling the position of the actuator for positioning the apparatus; and mechanical fasteners, electrical wiring and electrical connectors as required for installation of the apparatus, the actuator, the sensor and the control system in the combine.

9. A method of distributing crop material onto a cleaning sieve of an agricultural combine, comprising:

providing a crop material distributor disposed generally forward of and above the sieve, for distributing crop material from a threshing system generally evenly onto the sieve;

providing at least one sensor configured and operable for sensing information representative of at least one of a quantity of grain associated with the crop material distributor and an inclination angle associated with the crop material distributor, and outputting signals representative thereof;

controlling flow of the crop material from over the crop material distributor and on to the sieve via a rotation of an apparatus pivotally connected to the crop material distributor; wherein the rotation of the apparatus toward a position substantially perpendicular to the crop material distributor further impedes the flow of crop material from the threshing system over the apparatus on to the sieve;

controlling a position of the apparatus as a function of signals from the at least one sensor, and;

changing an angle of connection between the apparatus and the distributor via the rotation altering the flow of crop material over the apparatus to the sieve, wherein the apparatus is configured to be rotated above a surface of the distributor in a first orientation.

10. The method of claim 9, wherein providing the apparatus includes positioning the apparatus in close proximity with an end of the crop material distributor that is near the sieve.

11. The system of claim 1, wherein the surface is comprised of a solid piece of material or has slots or openings in the material.

* * * * *